US005213310A

United States Patent [19]

Beattie et al.

[11] Patent Number: 5,213,310

[45] Date of Patent: May 25, 1993

[54] HYDRAULIC RELEASE VALVE

[75] Inventors: John M. Beattie; Jimmie D. Sinden, both of Greeley, Colo.

[73] Assignee: TRLI, Inc., Greeley, Colo.

[21] Appl. No.: 802,250

[22] Filed: Dec. 4, 1991

[51] Int. Cl.[5] ............ F16K 31/524

[52] U.S. Cl. ............ 251/229; 251/263; 251/339; 137/596.2

[58] Field of Search ............ 137/596.2; 251/251, 251/263, 298, 319, 229, 339; 74/5, 89, 567

[56] References Cited

U.S. PATENT DOCUMENTS

| | | | |
|---|---|---|---|
| 1,244,976 | 10/1917 | Geurink | 137/596.2 |
| 2,099,636 | 11/1937 | Weaver . | |
| 2,185,325 | 1/1940 | Barrett et al. | 137/596.2 |
| 2,317,628 | 4/1943 | Martin | 137/596.2 |
| 2,366,693 | 1/1945 | Benaway | 137/596.2 |
| 2,494,753 | 1/1950 | Gardiner | 137/596.2 |
| 2,564,267 | 8/1951 | Manke . | |
| 2,840,248 | 6/1958 | Grove et al. . | |
| 2,991,800 | 7/1961 | Becker | 137/596.2 |
| 3,125,120 | 3/1964 | Hasbany | 137/596.2 |
| 3,559,689 | 2/1971 | Dunbar et al. | 137/596.2 |
| 3,734,466 | 5/1973 | Mason . | |
| 3,774,504 | 11/1973 | Bonney | 137/596.2 |
| 3,854,499 | 12/1974 | Sievenpiper | 137/596.2 |
| 4,027,697 | 6/1977 | Bonney | 137/596.2 |
| 4,058,293 | 11/1977 | Kameda . | |
| 4,196,887 | 4/1980 | Tsujimura . | |
| 4,540,329 | 9/1985 | Martin . | |
| 4,793,593 | 12/1988 | Pittman . | |
| 4,856,618 | 8/1989 | Isogai . | |

FOREIGN PATENT DOCUMENTS

| | | | |
|---|---|---|---|
| 1120231 | 12/1961 | Fed. Rep. of Germany | 137/596.2 |
| 1092919 | 4/1955 | France | 137/596.2 |
| 2404785 | 1/1979 | France | 137/596.2 |
| 1330011 | 9/1973 | United Kingdom | 137/596.2 |

OTHER PUBLICATIONS

Automotive Lifts & Machinery Corp. brochure "ALM 2-Post Vehicle Lifts" Feb. 1, 1990.
G & H Products brochure "UNI-LIFT Model 390" undated.
Precision Metal Works brochure "Mule 3000" undated.
Snap-On Tools Corporation brochure "Above Ground Lifts for the Professional" undated.

*Primary Examiner*—George L. Walton
*Attorney, Agent, or Firm*—Dean P. Edmundson

[57] ABSTRACT

A pressure release valve for use in a supply line of pressurized fluid. The valve includes a housing, a valve for closing a passageway, and a control for tilting the valve to release pressure in the supply line. The release valve is more easily opened than conventional release valves.

6 Claims, 16 Drawing Sheets

HYDRAULIC RELEASE VALVE

CROSS-REFERENCE TO RELATED APPLICATIONS

Various other aspects of the apparatus and methods described herein are claimed in the following copending commonly assigned applications filed on Dec. 4, 1991: U.S. patent application Nos. 07/802,243; 07/802,244; 07/802,246; 07/802,247; 07/802,248; 07/802,256; 07/802,259; 07/802,268; 07/802,450; and 07/802,451.

FIELD OF THE INVENTION

This invention relates to lifting apparatus for lifting of equipment to enable inspection, servicing and repair. More particularly, this invention relates to improvements to powered lift apparatus which is especially useful for lifting outdoor power equipment, recreational vehicles, utility vehicles, etc.

BACKGROUND OF THE INVENTION

Golf course mowing equipment and other commercial mowing devices typically require frequent (e.g., daily) inspection, adjustment, servicing, or repair of various components. It is very difficult to access all of the components of the equipment without lifting the equipment or crawling under it. Conventional chain hoists are not suitable for lifting most types of power equipment because there normally aren't readily accessible portions of the frame to which several chains can be connected for lifting. Also, the equipment may not be stably supported with chains.

Conventional automobile hoists and lifts are also not adaptable to lifting equipment such as commercial mowers (e.g., three-wheeled mowers) or various other types of equipment which do not have a frame which can be readily engaged by conventional hoist lifting arms. Conventional hoists or lifts do not include the types of adjustability which would be required in order to permit lifting of various types of power equipment. Those hoists which include arms which extend under a vehicle to be lifted require that the arms reach and engage the frame of the vehicle. Although this is possible when lifting conventional automobile vehicles, it is difficult or impossible to do this when attempting to lift various types of power equipment.

Furthermore, it is difficult to align power equipment such as commercial mowers with a conventional hoist or lift of the type intended for lifting automobiles. This makes the use of conventional hoists or lifts even more difficult or cumbersome for lifting equipment such as large mowers, three-wheeled vehicles, etc.

Hoists, jacks and other types of apparatus have previously been used for various lifting purposes. See, for example, the hoists described in U.S. Pat. Nos. 2,099,636; 2,564,267; 3,734,466; 4,058,293; 4,196,887; and 4,856,618. Other lifting devices are also described in U.S. Pat. Nos. 4,793,593; 4,540,329; and 2,840,248.

None of such prior hoist and lifting devices are entirely suitable or practical for lifting and supporting odd-shaped vehicles and certain types of power equipment (e.g., three-wheeled vehicles such as mowers). Also, the hoist systems which are intended for use in lifting automobiles and garden tractors or the like typically require that the vehicle be very carefully aligned with the lifting apparatus in order to be lifted. If the vehicle is not properly aligned, the lifting mechanism either cannot engage the vehicle, or the weight of the vehicle is not properly balanced on the lift mechanism. This condition can be very dangerous because the vehicle could slip or fall off the lift, causing damage to the vehicle and injury to any workmen who may be under or near the vehicle.

Some of the conventional hoist systems are also unsuitable because they include rails, platforms, or other lifting structure which extends underneath the vehicle. Such structure can interfere with required access to the underside of the vehicle for inspection, servicing, or repair purposes.

Although ramps are sometimes used to support a vehicle in an elevated position, this can be very dangerous. Also, the amount of elevation obtained with ramps is limited.

There has not heretofore been provided lifting apparatus which is suitable or practical for safely and efficiently lifting outdoor power equipment (e.g., three-wheeled mowers), utility vehicles, recreational vehicles, etc.

SUMMARY OF THE PRESENT INVENTION

In accordance with the present invention there is provided a pressure release valve assembly for use in a hydraulic power system. The valve assembly and power system are useful in lifting apparatus which is especially useful for lifting vehicles and equipment (e.g., three-wheeled mowers) to enable inspection, servicing and repair thereof. The lifting apparatus is especially useful for lifting and supporting equipment such as large commercial mowers and other types of outdoor power equipment and vehicles which cannot be safely lifted and supported by means of conventional automobile hoists and lifts.

In one embodiment the invention provides a pressure release valve assembly for use in a supply line of pressurized fluid in a hydraulic power system which is useful, for example, in lifting apparatus for lifting a three-wheeled vehicle, the apparatus providing an unobstructed entryway and lifting means to readily adapt to the vehicle so that the vehicle can be quickly and conveniently driven into the apparatus, without having to align the vehicle with the longitudinal axis of the lifting apparatus. The apparatus can readily adapt to vehicles of different sizes.

The pressure release valve assembly comprises:

(a) a housing including an inlet port and first and second outlet ports; wherein the housing further includes first and second passageways; wherein the first passageway extends between the inlet port and first outlet port for enabling pressurized fluid to flow through the housing; and wherein the second passageway extends between the first passageway and second outlet port;

(b) a valve member positioned to normally close the second passageway; and (c) control means for tilting the valve member relative to the second passageway to release pressure in the supply line by allowing fluid to flow from the first passageway to the second outlet port through the second passageway.

The release valve assembly of this invention is useful in apparatus for lifting power equipment and vehicles of various types and styles, wherein wheel lift means are movable longitudinally, and preferably also transversely, with respect to tool members. There is no need to have the equipment or vehicle aligned parallel to the tool bars. The wheel lift means can be moved and positioned such that they will properly and desirably engage the wheels of the unit to be lifted regardless of any misalignment between the vehicle and the apparatus.

The lifting apparatus which includes the pressure release valve assembly of this invention is suitable for safe and effective lifting of a wide variety of vehicles and power equipment (e.g., commercial mowers, three-wheeled and four-wheeled vehicles, golf carts, recreational vehicles, etc.). The apparatus does not require access to the frame of the vehicle or the equipment in order to safely lift it, and no special alignment is required in order to allow the lift to operate. Also, the lift apparatus does not require any vertical adjustment of arms or hangers in order to properly engage the vehicle or the equipment to be lifted.

The lift apparatus is very open and enables a vehicle to be driven easily into the area between the tool bar members. After the wheel lift means have engaged the wheels, the vehicle can be lifted to the desired height. The underside of the vehicle is completely open and accessible to enable inspection, servicing and repair of the vehicle. In other words, the lift apparatus does not obstruct access to the underside of the vehicle.

Other advantages of the apparatus of the invention will be apparent from the following detailed description.

BRIEF DESCRIPTION OF THE DRAWINGS

The invention is described in more detail hereinafter with reference to the accompanying drawings, wherein like reference characters refer to the same parts throughout the several views and in which.

DETAILED DESCRIPTION OF THE INVENTION

Figure 1:
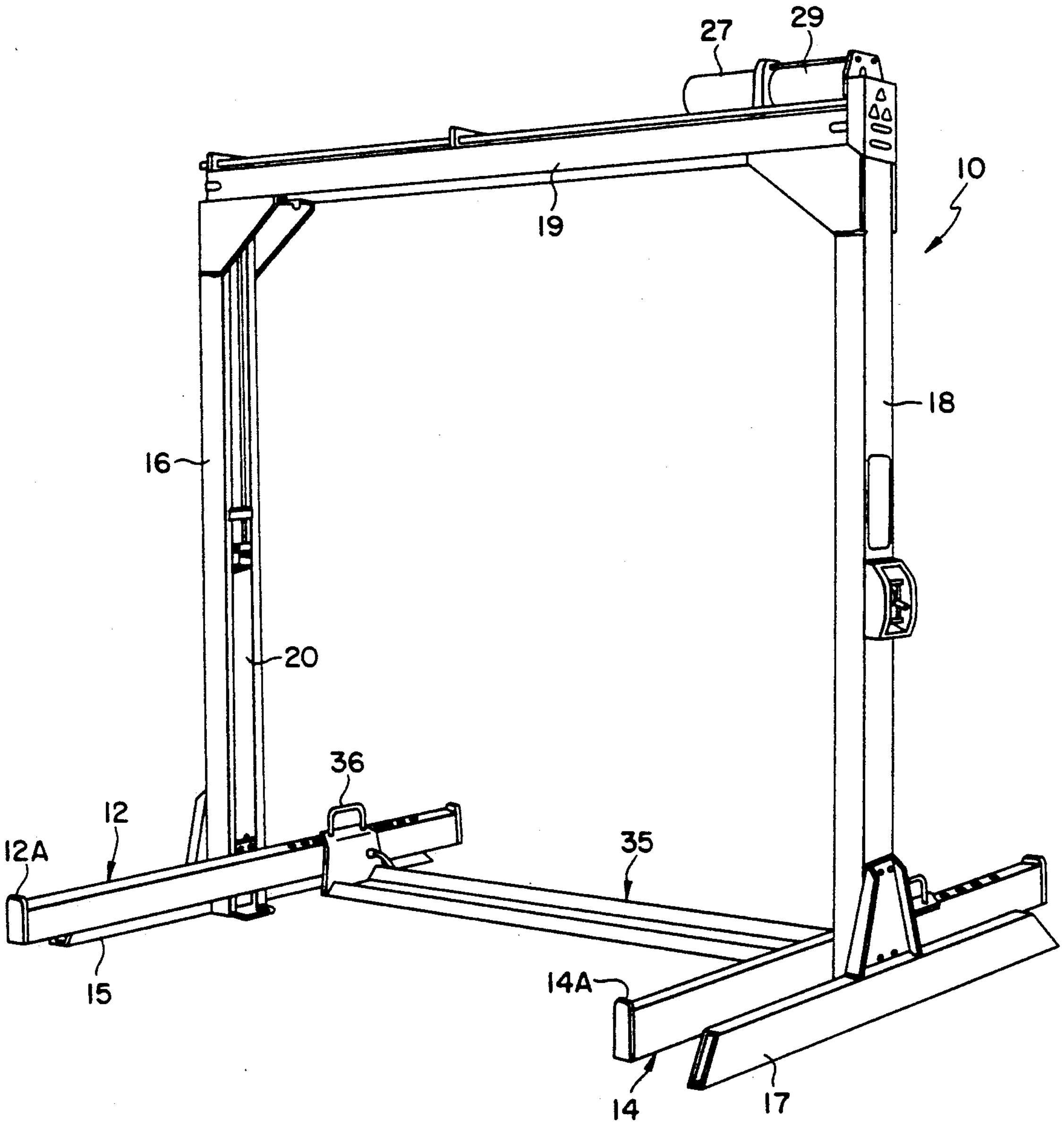
FIG. 1 is a perspective view illustrating one embodiment of lifting apparatus of the invention (prior to attachment of side wheel lift means)
Figure 2:
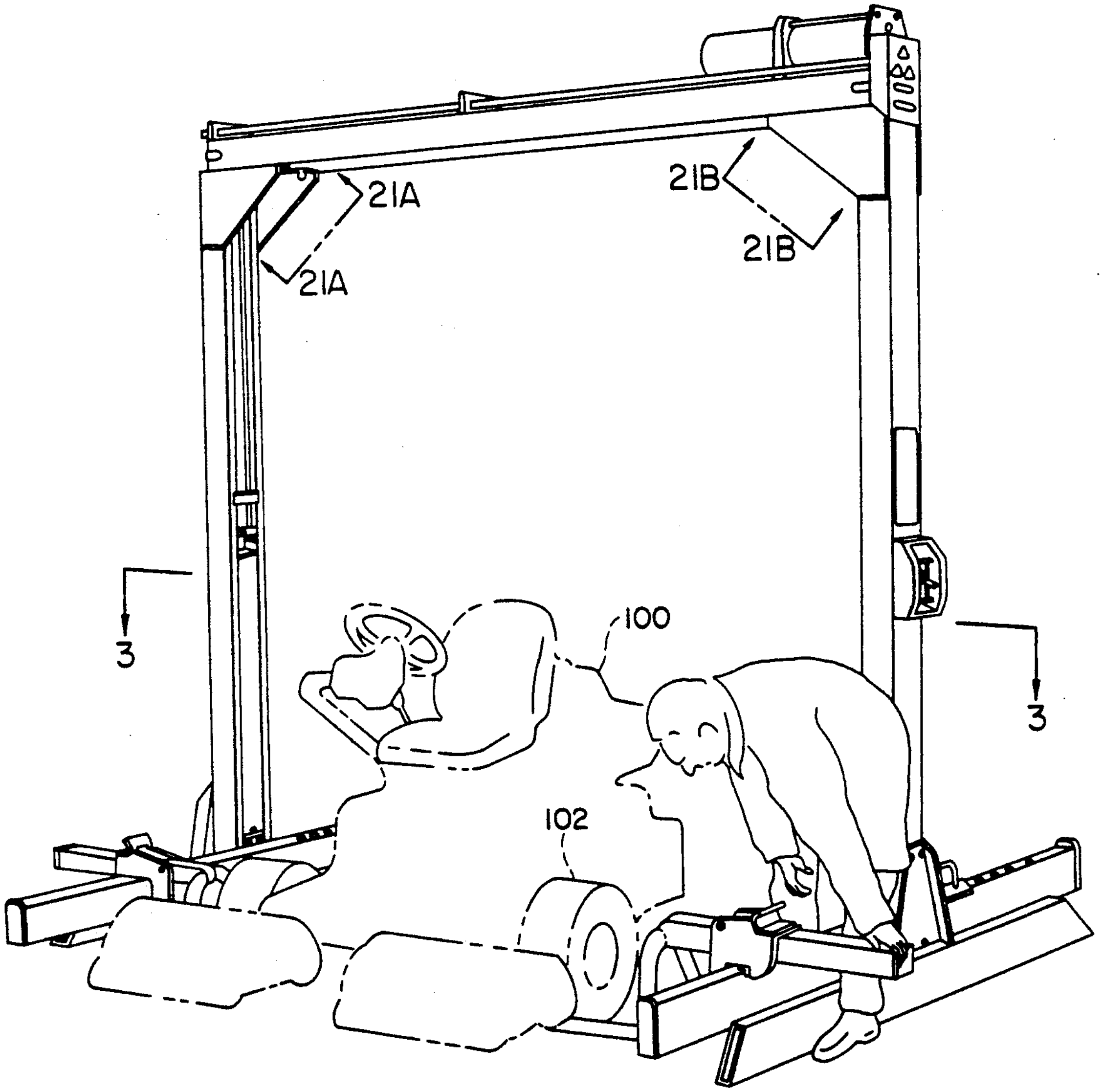
FIG. 2 is a perspective view of the lifting apparatus of FIG. 1 with a large commercial mower positioned between the tool bar members in preparation for being lifted by the apparatus.
Figure 22:
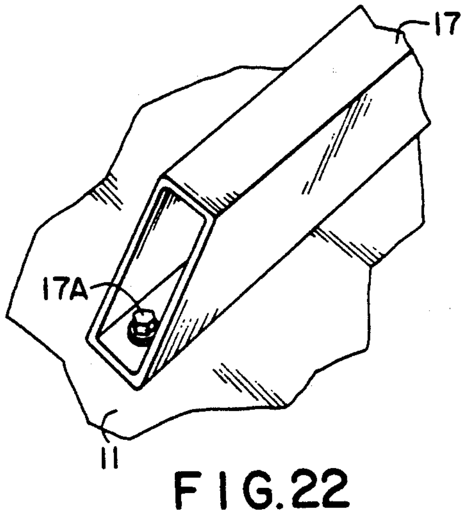
FIG. 22 illustrates one manner in which a leg of the upright support member can be secured to the floor.

In FIG. 1 there is illustrated one embodiment of lift apparatus 10 which is useful in this invention. The apparatus includes spaced-apart elongated tool bar members 12 and 14, upright support members 16 and 18, and cross member 19. Floor supports 15 and 17 are secured to the lower ends of the upright members 16 and 18, respectively. The floor supports can be bolted to the floor of the shop or building in which the lift apparatus is to be used, if desired. This is illustrated in FIG. 22 where bolt 17A is used to secure floor support 17 to a floor 11. By bolting the apparatus to the floor, the apparatus is extremely stable and is prevented from moving or tipping. Depending upon the length of the floor supports 15 and 17, it may not be necessary to secure them to the floor.

As illustrated in FIG. 1, the tool bar members are transversely spaced apart such that a large open area is defined between them into which a vehicle to be lifted can be quickly and conveniently driven. There is no need to align the vehicle with the tool bar members or with the longitudinal axis of the apparatus. The longitudinal axis is defined as the axis perpendicular to the plane defined by the two upright support members. When the tool bar members are parallel to each other, the longitudinal axis of the lift apparatus is parallel to the tool bar members.

In the lift apparatus illustrated in the drawings the tool bar members are parallel to each other, but it is possible for them to be non-parallel if desired. For example, the rearward ends of the tool bar members could be angled towards each other. The rearward ends of the tool bar members could even be connected, if desired. Preferably the tool bar members are horizontal, as illustrated.

Each tool bar member is preferably secured to a vertical slider member 20 which is slidably retained in a respective upright support member. The upper end of each slider member is attached to a lift cable system.

Figure 10:
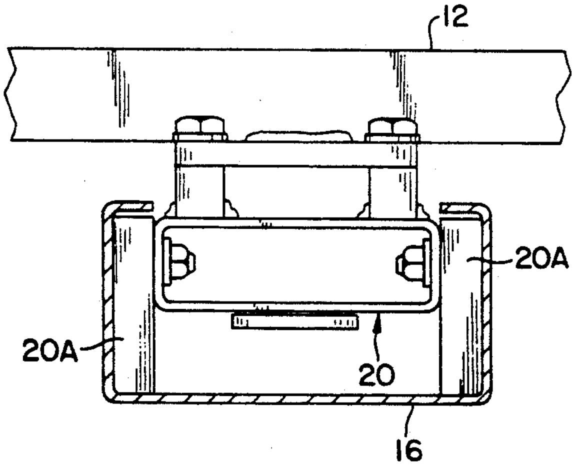
FIG. 10 is a cross-sectional view taken along line 10–10 in FIG. 9.
Figure 23:
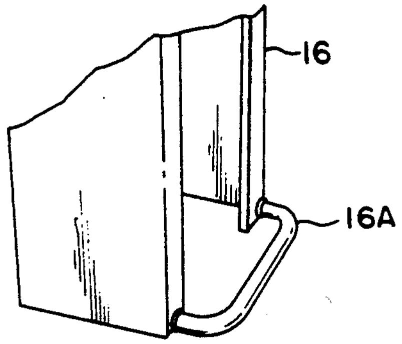
FIG. 23 shows the lower end of one of the upright support members.

As illustrated in FIG. 10, the upright support member is tubular in nature and includes a wide longitudinal slot along its length. There preferably are blocks 20A secured to opposite edges of the slider member to approximate the interior dimensions of the upright support member. As a result, the tool bar member is prevented from tilting, twisting or rotating relative to the upright support member. The lower end of each support member preferably includes a transverse bar or rod secured thereto to maintain the proper dimension for the upright. This is illustrated in FIG. 23 where bar 16A is secured to the lower end of upright 16.

Figure 8A:
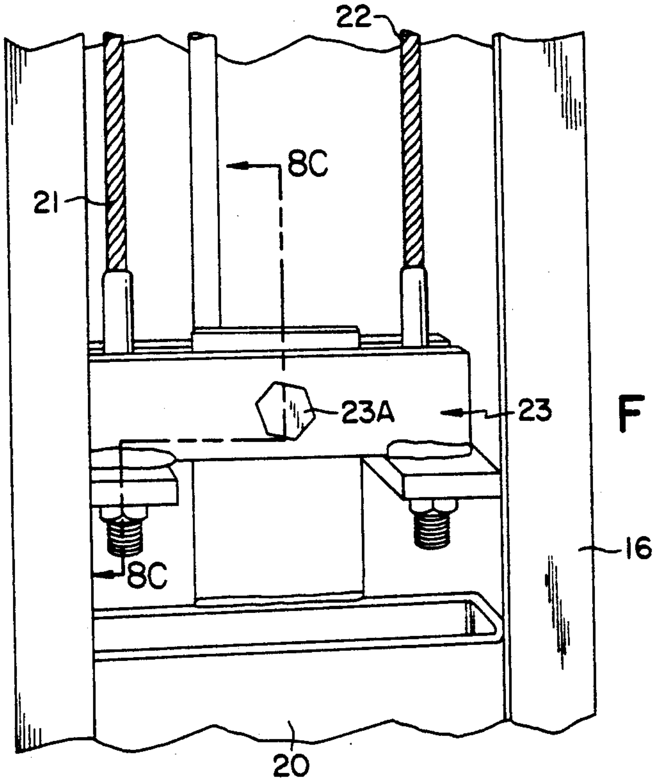
FIGS. 8A–8C illustrate a preferred manner in which the cables are connected to a vertical slide member for lifting one of the tool bars.
Figure 8C:
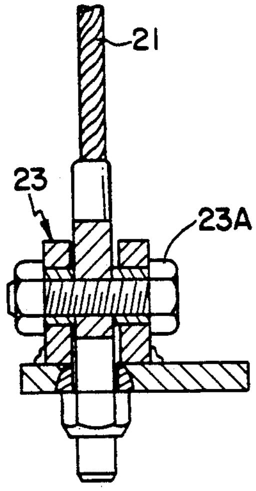
Figure 8B:
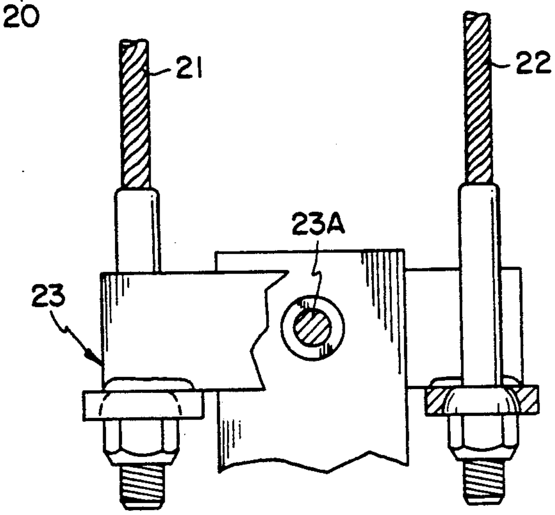
Figure 9:
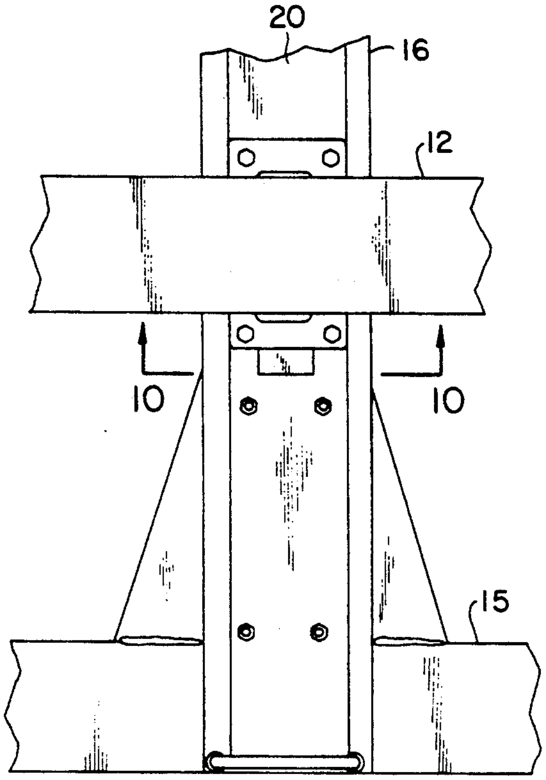
FIG. 9 is a side elevational view showing one of &he tool bar members and one of the upright support members.
Figure 20:
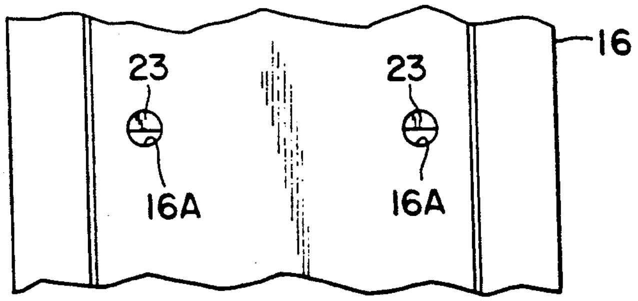
FIG. 20 is a side elevational view of one of the upright support members showing openings for viewing the equalizer bar to which the lift cables are attached.
Figure 21A:
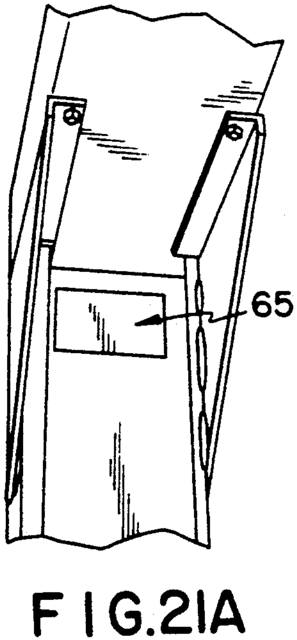
FIGS. 21A and 21B show the placement of a photocell and reflector which is useful in a high lift warning system in the apparatus of the invention.
Figure 21B:
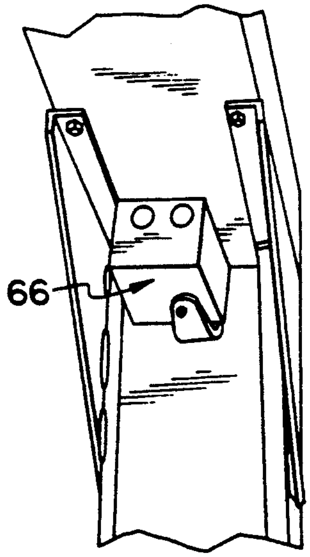

The lift cable system preferably comprises two cables 21 and 22 which are attached to each slider member by means of an equalizer bar 23. The equalizer bar is attached to the upper end of the slider member by means of bolt 23A in such a manner that the equalizer bar can pivot about its center, as shown in FIGS. 8A–8C, for example. In the event that one of the cables fails (e.g., breaks or becomes loosened), the other cable will still support the tool bar. This is an additional safety feature. FIG. 20 shows apertures 16A in upright support 16 which enable one to observe whether the equalizer bar 23 is in a level position, thereby indicating that the two cables are still properly connected and operational.

A preferred type of wheel lift means for use in this invention is illustrated in FIGS. 5A–5D. The wheel lift means shown comprises a lift fork member 40 having an elongated shank member 42 secured thereto. The fork lift member includes spaced-apart forks or bars 40A. The length of the forks, and the distance separating the forks, may vary as desired to accommodate any size wheel. The forks or bars can slidably engage a wheel of a vehicle to be lifted forwardly and rearwardly of the foot print of the wheel, i.e., one fork extends along the floor in front of the wheel and the other fork slides along the floor behind the wheel. The foot print of the wheel is defined as the portion of the wheel in contact with the floor. The wheel of the vehicle does not have to be lifted in order to be engaged by the forks.

The shank 42 extends away from the fork member 40 as illustrated. The length of shank 42 may vary. The diameter and cross-sectional configuration of the shank member may also vary. Preferably the shank is square or rectangular in cross-section.

The lift fork means is detachably connected or attached to one of the tool bar members by means of a hanger 45 comprising a body member which includes opposing arms 46 and 47. When the hanger is attached to the tool bar member, arm 46 bears against one side of the tool bar member and arm 47 bears against the other side. This is best illustrated in FIG. 5B.

Preferably the tool bars are non-circular in cross-section so that the hanger means (to which the lift forks are attached) will not rotate toward the item to be lifted when the tool bars are raised. As illustrated in the drawings, a rectangular cross-section for the tool bars is very suitable. A square cross-section or other polygonal or non-circular cross-section is also useful for the tool bars. If a circular cross-section tool bar is used, then the hanger must be bolted, pinned, or keyed to the tool bar to prevent undesirable angular rotation.

Figures 5A, 5B, 5C, 5D:
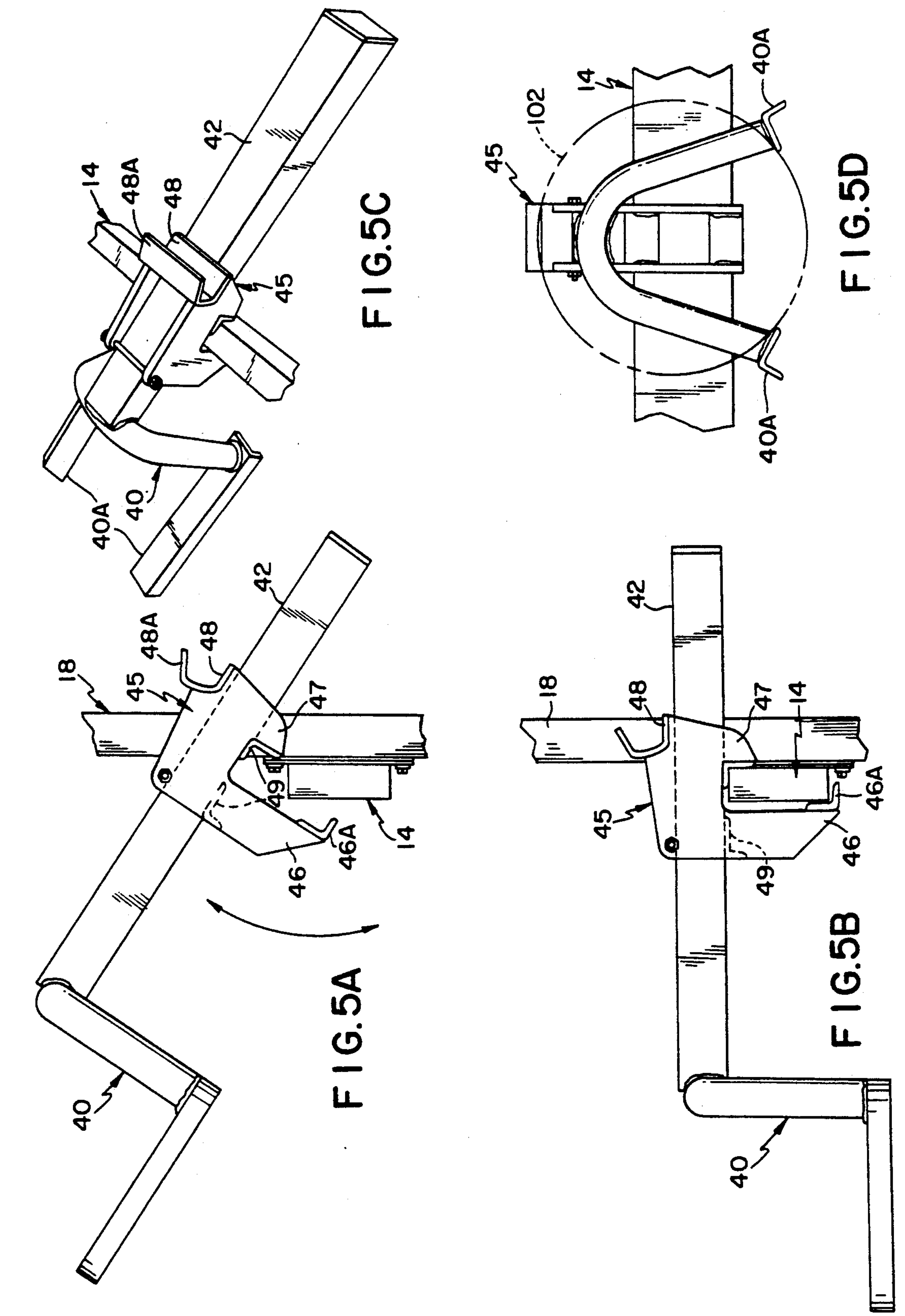
FIGS. 5A–5D illustrate a preferred embodiment of wheel lift fork means which is useful in this invention.

As illustrated in FIGS. 5A and 5B the lower end of arm 46 of the hanger preferably includes a lip 46A which extends under the lower edge of the tool bar. The lip 46A (a) prevents the hanger 45 from being lifted straight upwardly and (b) prevents hanger 45 from being positioned partially over the end of the tool bar 12 or 14. The end of each tool bar preferably includes a raised end portion (i.e., 12A and 14A). Because the vertical dimension of end portions 12A and 14A is greater than the vertical dimension between lip 46A and bars 49 in hanger 45, the hanger cannot be attached to the extreme outer end of either tool bar. This safety feature prevents the hanger from being only partially attached to the end of the tool bar.

The upper portion of the hanger body includes a receiver portion for slidably receiving the shank 42 of the fork means. The receiver includes an upper bar 48 which prevents the shank 42 from moving upwardly away from the tool bar. Handle 48A may be integral with the bar 48.

Thus, angular movement or rotation of the hanger 45 relative to the tool bar in the direction of the item to be lifted is prevented by means of opposing arms 46 and 47 which engage opposite sides of the tool bar. Angular movement or rotation of shank 42 relative to the tool bar is prevented by means of bar 48 extending over shank 42. The shank member is supported on its lower surface by means of transverse bars 49. Thus, shank member 42 is very stably supported in hanger 45 against downward force applied on the fork member 40.

The shank member 42 is slidably received in the hanger 45 in a manner such that the transverse or lateral position of the shank relative to the hanger is easily adjusted, as required, in order to slide the forks 40A (a) around a wheel 102 of a vehicle to be lifted, or (b) away from the wheel 102 after servicing or repair of the vehicle is completed.

The longitudinal positioning of the hanger 45 relative to the tool bar may be adjusted by lifting the fork member and the attached end of the shank upwardly (as shown in FIG. 5A) and then simply sliding the hanger 45 along the tool bar to the desired position. Then the fork and shank are lowered, whereby the hanger 45 again engages opposing sides of the tool bar (FIG. 5B). When weight is applied to the fork member, the hanger tightly grips the tool bar and will not slide along the tool bar. The hanger also prevents the fork members from tipping downwardly.

Figure 3:
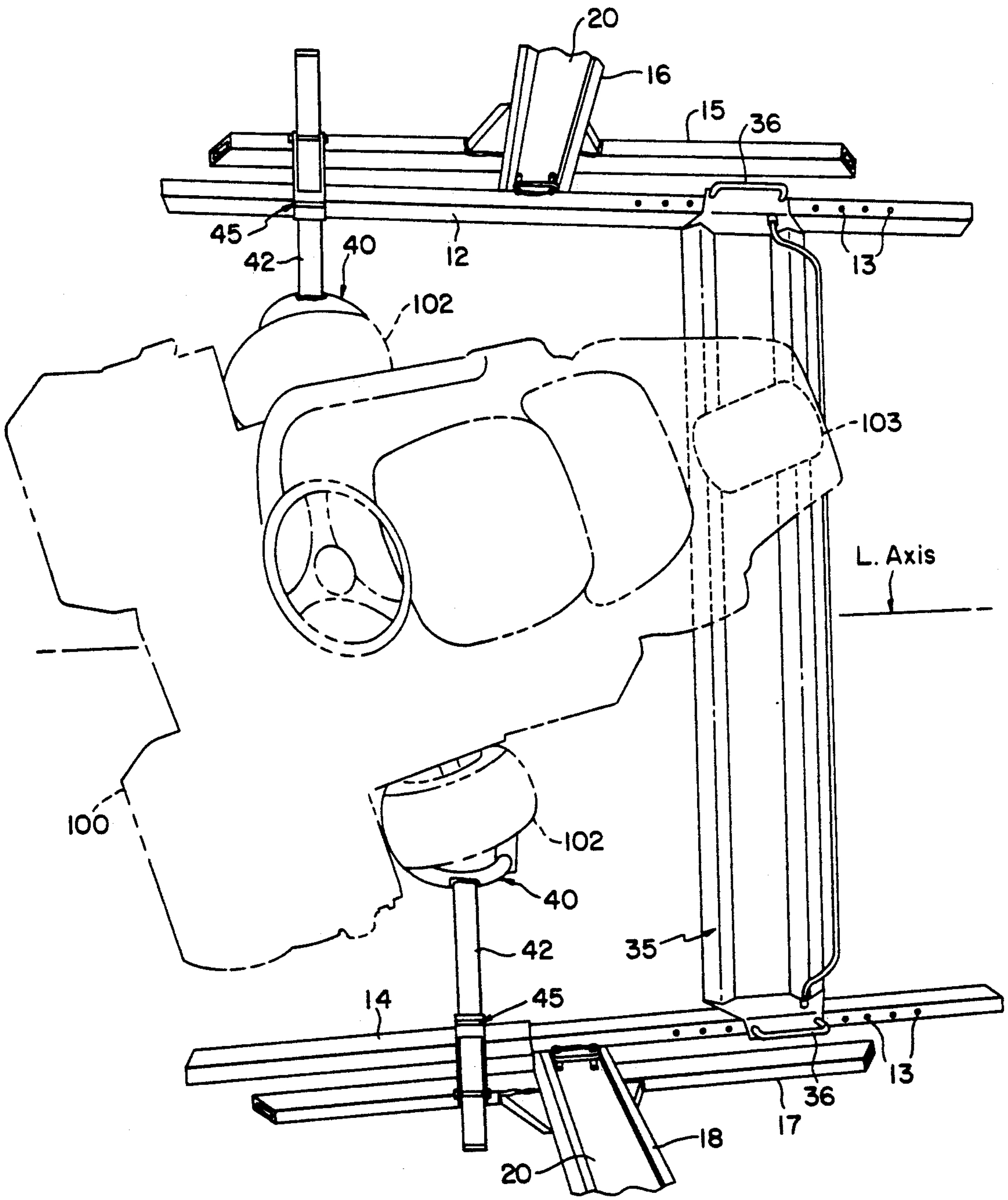
FIG. 3 is a top view illustrating one manner in which the apparatus of this invention is able to engage and support a large commercial three-wheeled mower for lifting purposes even when the mower is not aligned parallel to the tool bars.

Because the position of the fork members relative to the tool bars is adjustable both in the longitudinal and in the transverse or lateral directions, the fork members on the tool bars can be moved to any required position in order to properly engage the wheels of the vehicle, regardless of the position of the vehicle relative to the tool bars. This is very well illustrated in the top view of FIG. 3 wherein a large commercial mower 100 is positioned between the tool bar members 12 and 14. The mower is not aligned parallel to the tool bars or to the longitudinal axis of the lift apparatus, yet the fork members are able to easily and readily engage the side wheels 102 of the mower.

Although another fork member could be attached to one of the tool bars for the purpose of engaging and lifting wheel 103 of the mower, it is also possible to use a lift tray 35 which is supported between the tool bar members. Preferably the position of the tray 35 relative to the tool bars is adjustable. For example, the tool bars may include a plurality of spaced-apart apertures 13 along their top surface. A handle 36 at each end of the tray preferably includes a downwardly extending end or pin 36A which can engage an aperture 13 at the desired location along the tool bar. See FIGS. 14 and 15. This prevents the tray from sliding relative to the tool bars.

When lifting four-wheeled vehicles, it is possible to place two wheels on the lift tray and then use two fork members for engaging and lifting the other two wheels. Alternatively, a separate fork member may be used for lifting each wheel.

Figure 14:
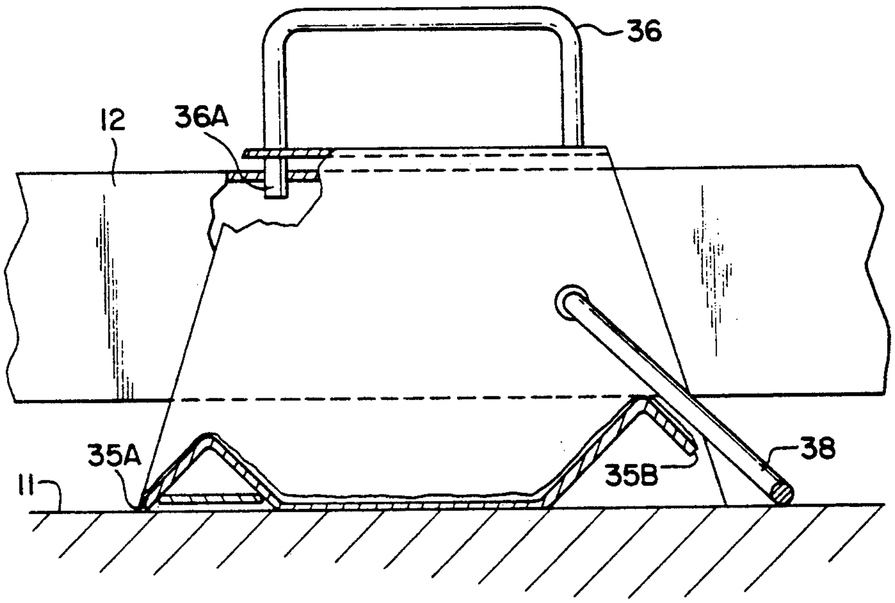
FIG. 14 is a cross-sectional view of the tray shown in FIG. 13 taken along line 14–14.
Figure 15:
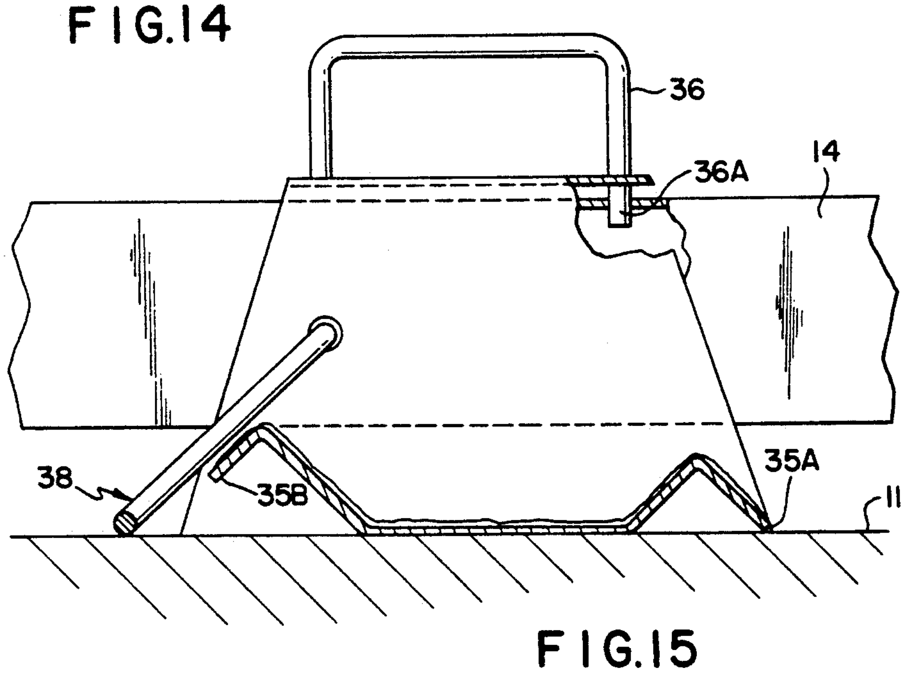
FIG. 15 is a cross-sectional view of the tray shown in FIG. 13 taken along line 15–15.
Figure 16:
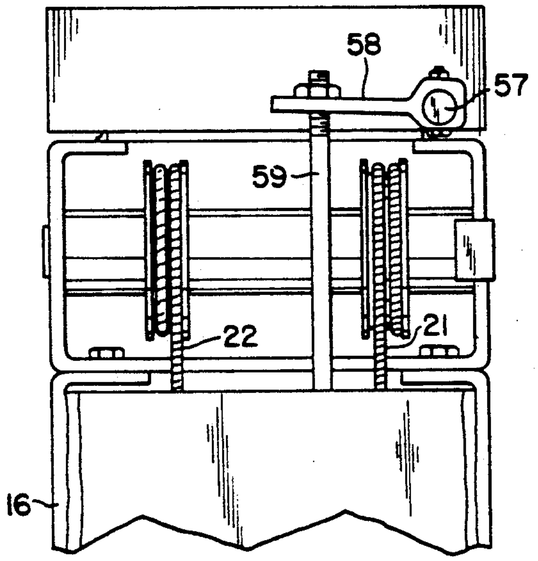
FIG. 16 is a side elevational view of the upper end of one of the upright support members.
Figure 17:
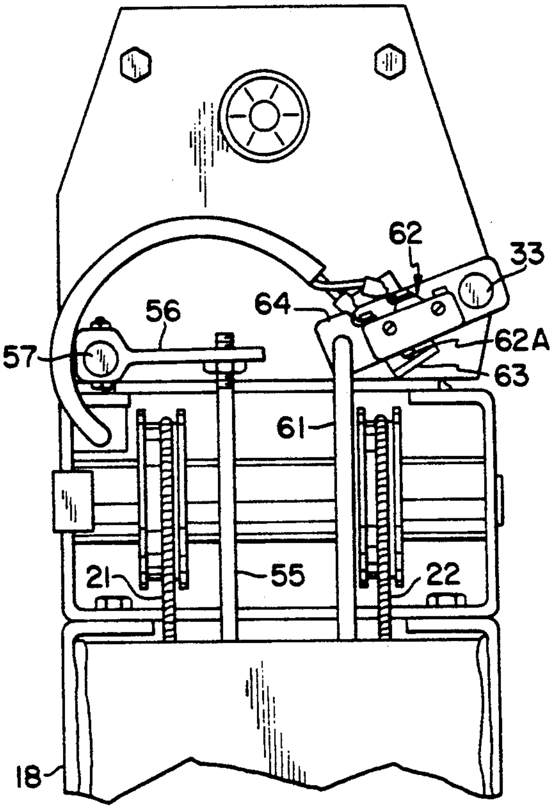
FIG. 17 is a side elevational view of the upper end of the other upright support member.
Figure 19:
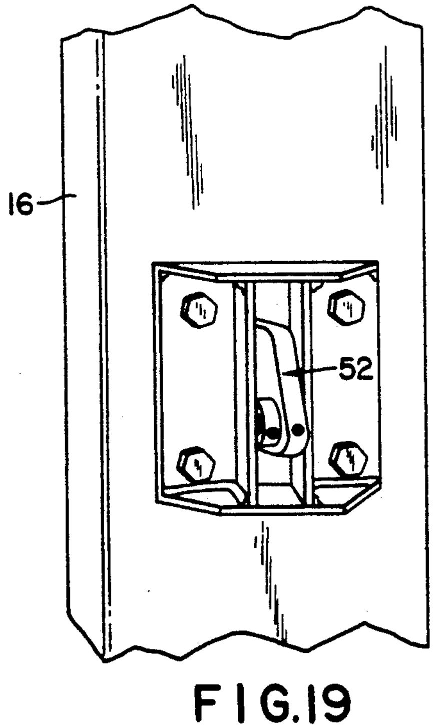
FIG. 19 is a perspective view showing the safety lock means on the other upright support member.
Figure 18:
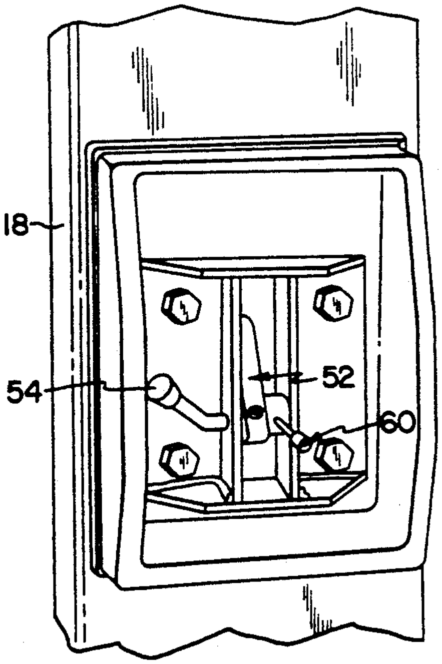
FIG. 18 is a perspective view showing the control levers accessible on one of the upright support members in the apparatus of the invention.

Another feature of the lift tray is apparent from FIGS. 14 and 15. One edge 35A of the tray extends to the floor 11 when the tool bars are in their lowered position so as to facilitate rolling of a wheel of a vehicle onto the tray. The opposite edge 35B of the tray does not extend downwardly to the floor. This helps to avoid pinching of a workman's feet under the edge 35B when the tool bars are lowered. Each side edge of the tray includes a raised rib to assist in retaining the wheel on the tray.

Figure 26A:
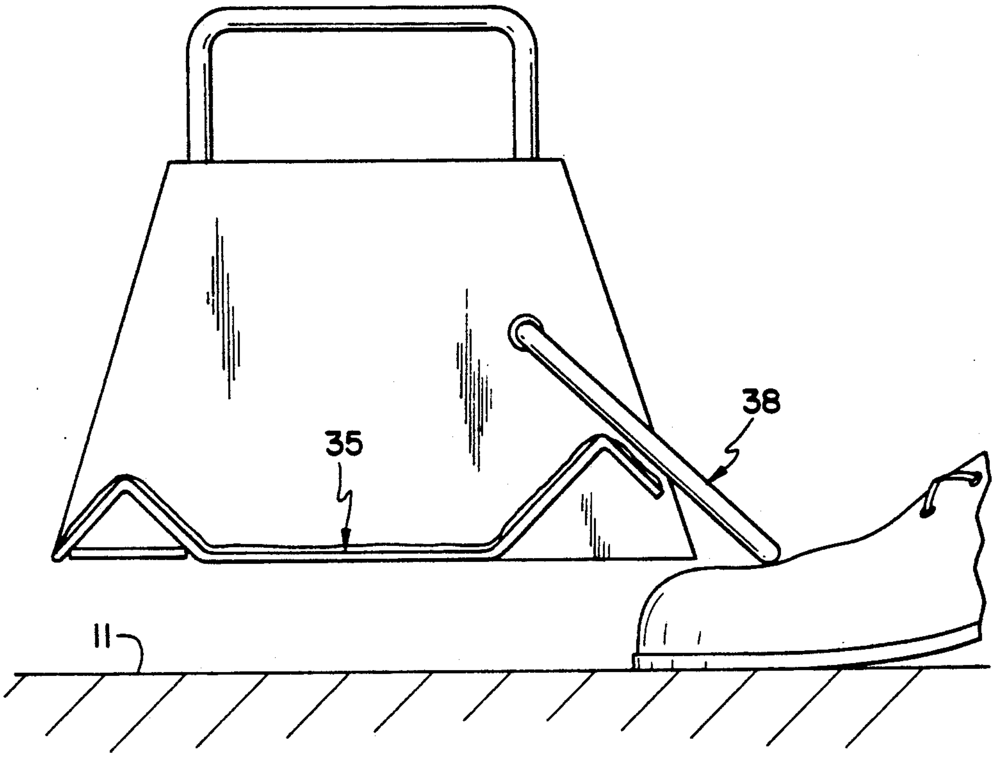
FIGS. 26A and 26B are elevational views illustrating operation of the foot guard system of the invention.
Figure 26B:
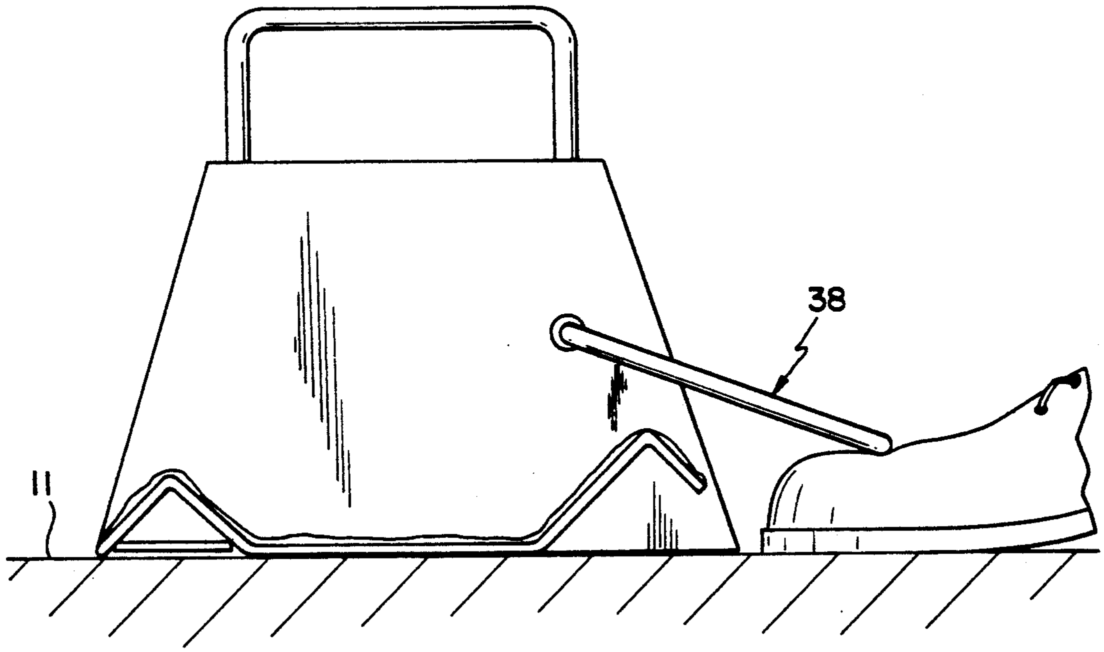
Figure 27:
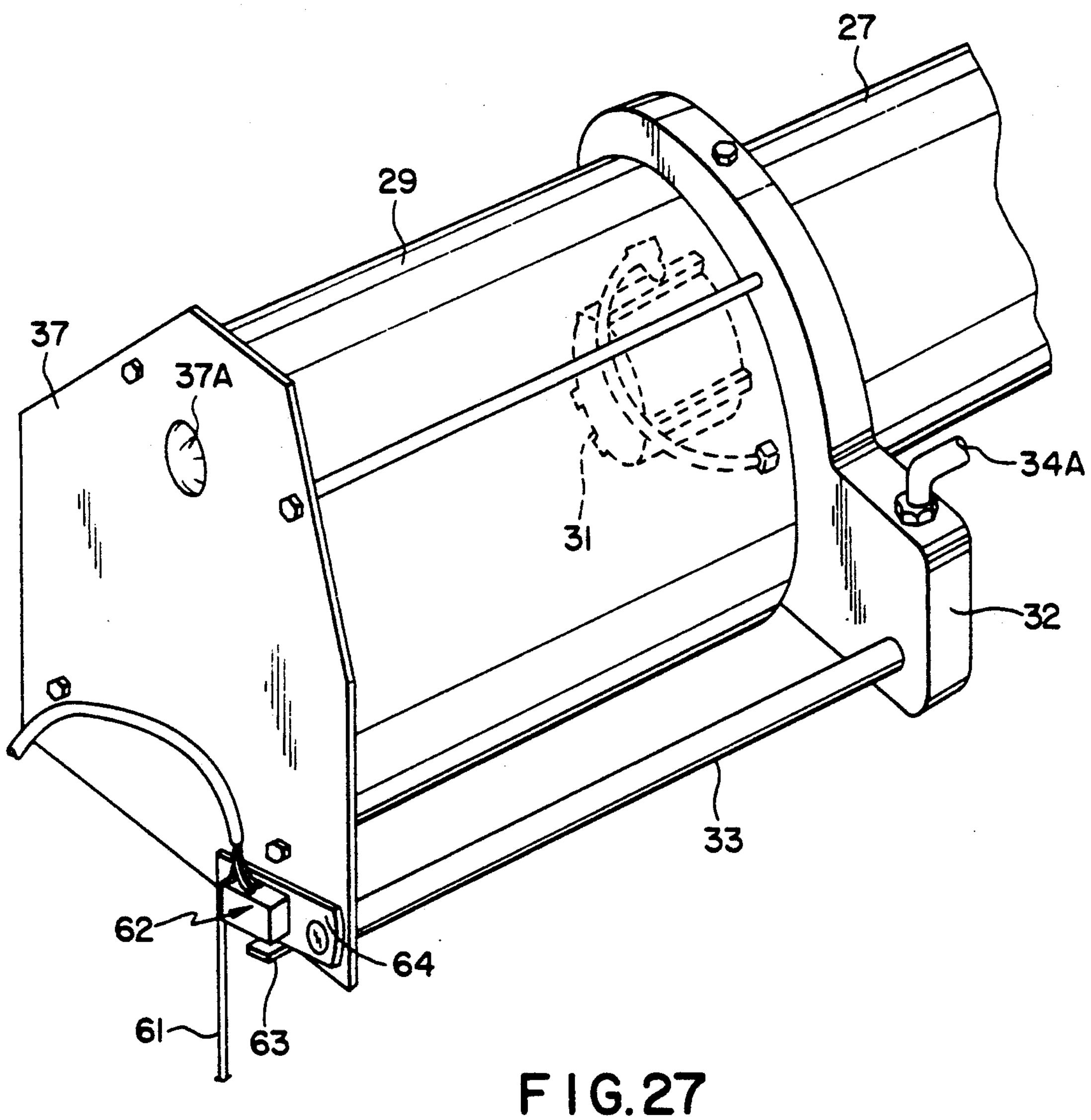
FIG. 27 is a perspective view of one embodiment of hydraulic power unit which is useful in this invention.

Another feature illustrated in the drawings is a toe or foot guard bar 38 which extends along the length of the tray. It is pivotably mounted at each of its ends. The bar 38 extends slightly forwardly of the tray. If a workman's foot is contacted by the bar 38 when the tool bars are lowered, the bar 38 causes the workman's foot to be pushed away from under the tray edge 35B. This is illustrated in FIGS. 26A and 26B.

Figure 4:
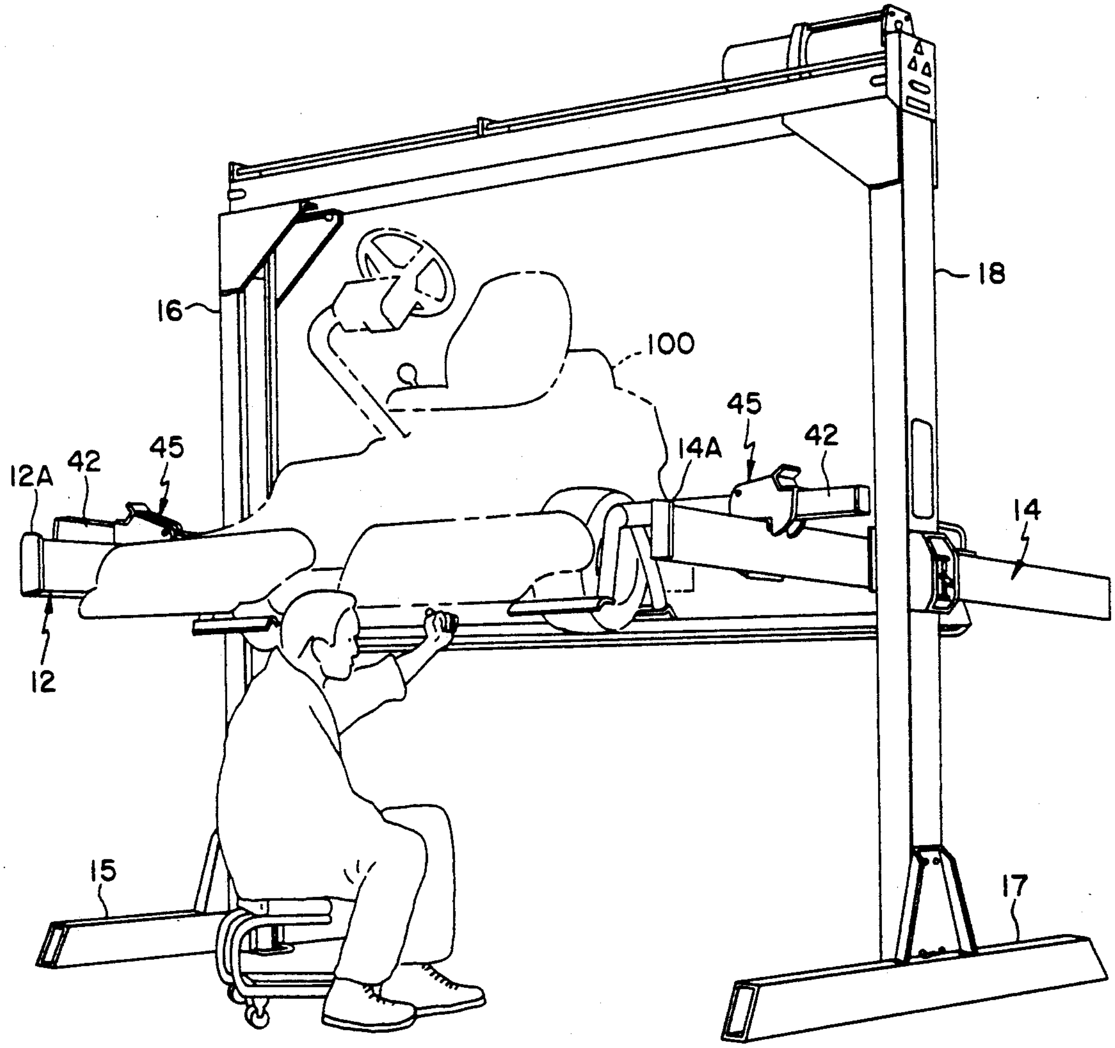
FIG. 4 is a perspective view illustrating a large commercial mower which is supported safely in an elevated position to enable a workman to inspect, service and repair components on the underside of the mower.

When the vehicle is lifted by the apparatus of this invention, the entire underside of the vehicle is easily accessible by workmen for inspection, servicing and repair. For example, when the vehicle is a large commercial mower (as illustrated, for example, in FIG. 4), a workman can access the functional components of the machine (e.g., cutting blades and knives) without having to crawl under the machine. As illustrated, the workman can sit on a rolling stool and work on the machine in a comfortable position. As a result, any inspection, servicing or repairs can be conducted in a very efficient and convenient manner.

Figure 6:
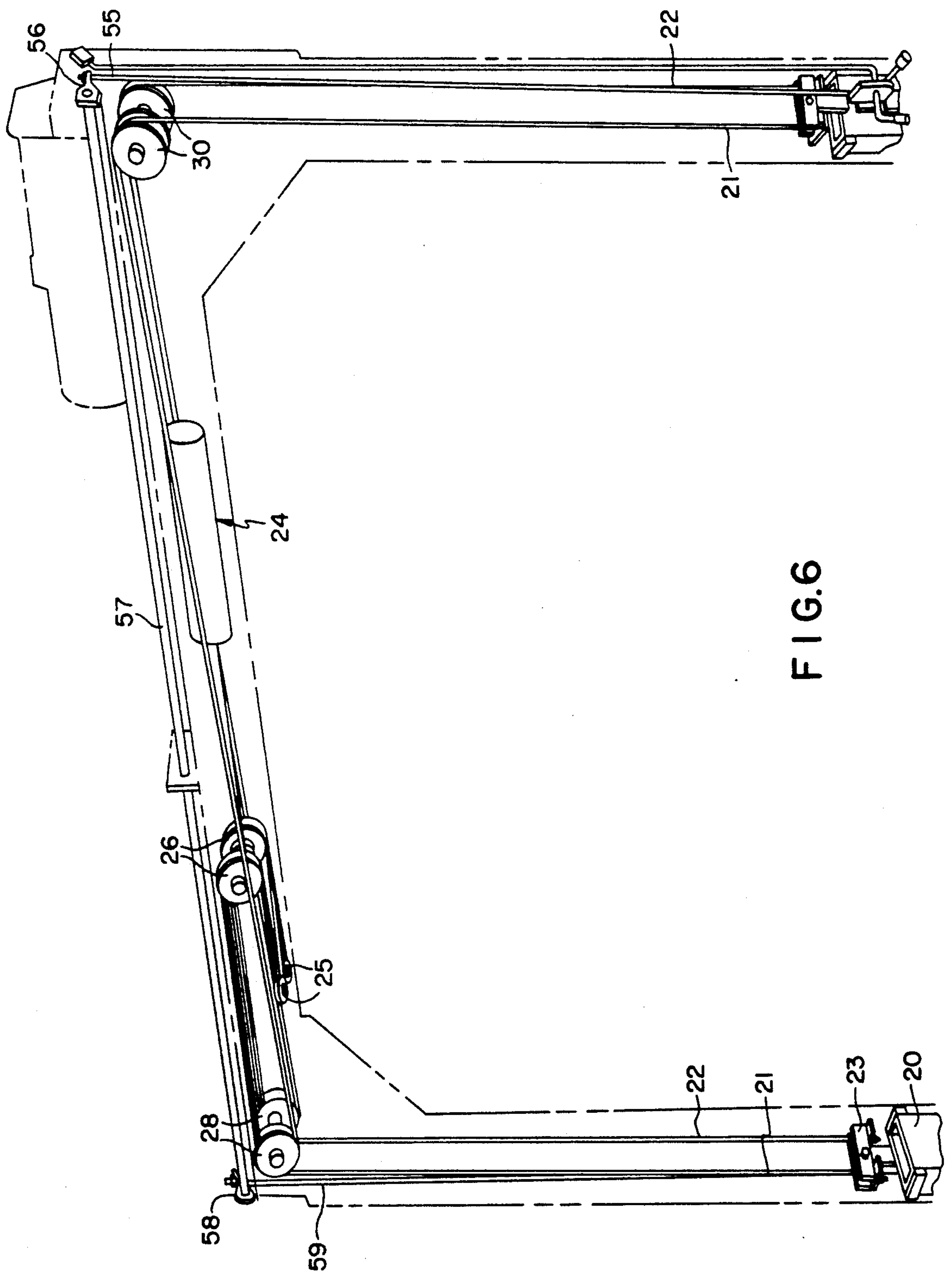
FIG. 6 illustrates a preferred embodiment of the cable means and hydraulic cylinder used to lift the tool bar members.
Figure 7:
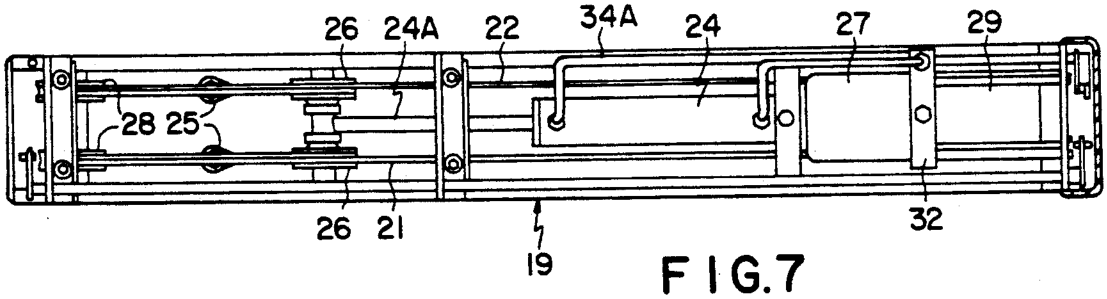
FIG. 7 is a top view of the cross member which connects the upper end of the two upright support members.

Hydraulic cylinder 24 is carried by the cross member 19. The cylinder 24 is powered by a hydraulic power unit comprising electric motor 27, oil reservoir 29, hydraulic pump with check valve 31, valve body assembly 32, and control shaft 33. The reservoir includes an end plate 37 and an oil level indicator window 37A. Ram 24A is movable between extended and retracted positions. Pulleys 26 are connected to the outer end of ram 24A. The cables 21 and 22 are secured intermediate their ends by bolts 25, and the cables extend around pulleys 26 and 28. One tail of each cable extends down through upright member 16 to connect to an equalizer bar 23 and slider member 20, as illustrated in FIG. 6. The other tail of each cable extends around pulley 28, then along the length of cross member 19 and over a pulley 30, after which it extends down through upright member 18 to connect to an equalizer bar and slider member.

When the ram 24A of cylinder 24 is retracted into cylinder 24, the cables 21 and 22 lift the two tool bars upwardly. This, of course, lifts whatever is engaged by the fork members and the lift tray. Because the ram 24A is being retracted into the cylinder in order to lift the tool bars, there is no need to utilize separate guide members for the ram. The tension on the cables maintains proper alignment of the ram with the cylinder. Because the tails of each cable are secured to opposite tool bars through equalizer bars, the load force acting upon each of the pulleys 26 is equalized. Also, this arrangement enables small conventional hydraulic cylinders to be used.

The lift apparatus of the invention also preferably includes a releasable safety lock system to prevent the tool bar members from inadvertently and undesirably falling with a load thereon. The safety system includes a rack secured to one of the slider members (or directly to a tool bar member). Preferably, a rack is secured to each of the slider members. The rack is aligned vertically.

Figure 11:
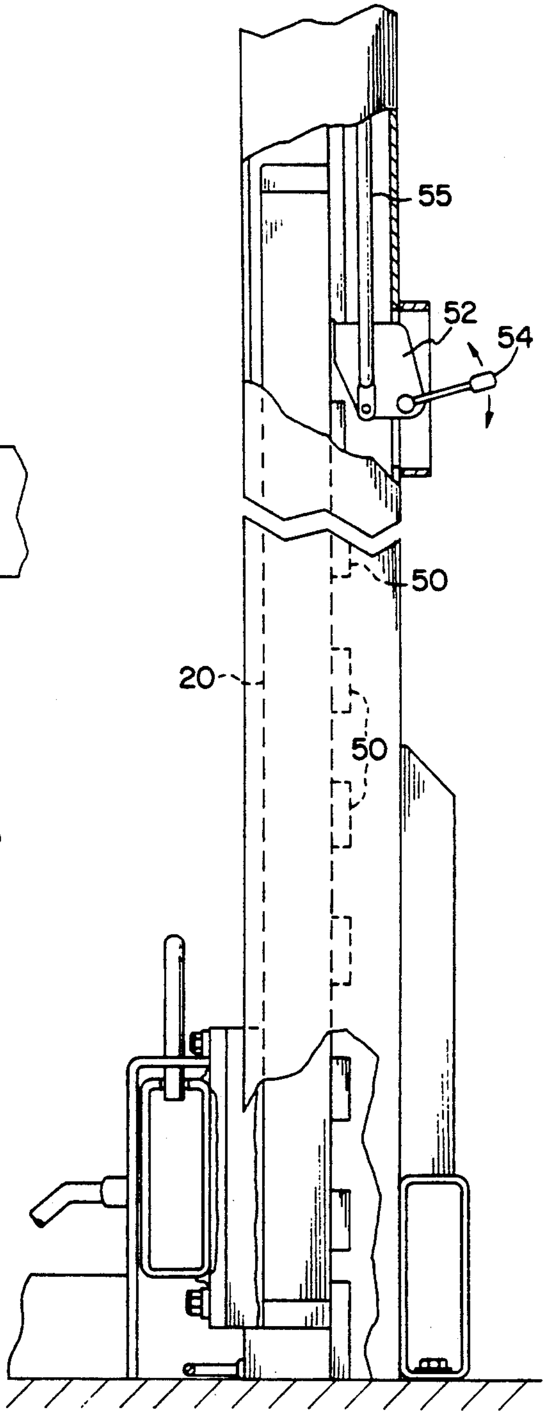
FIG. 11 is a front elevational partially cut-away view of one of the upright support members showing the releasable safety lock means.
Figure 12:
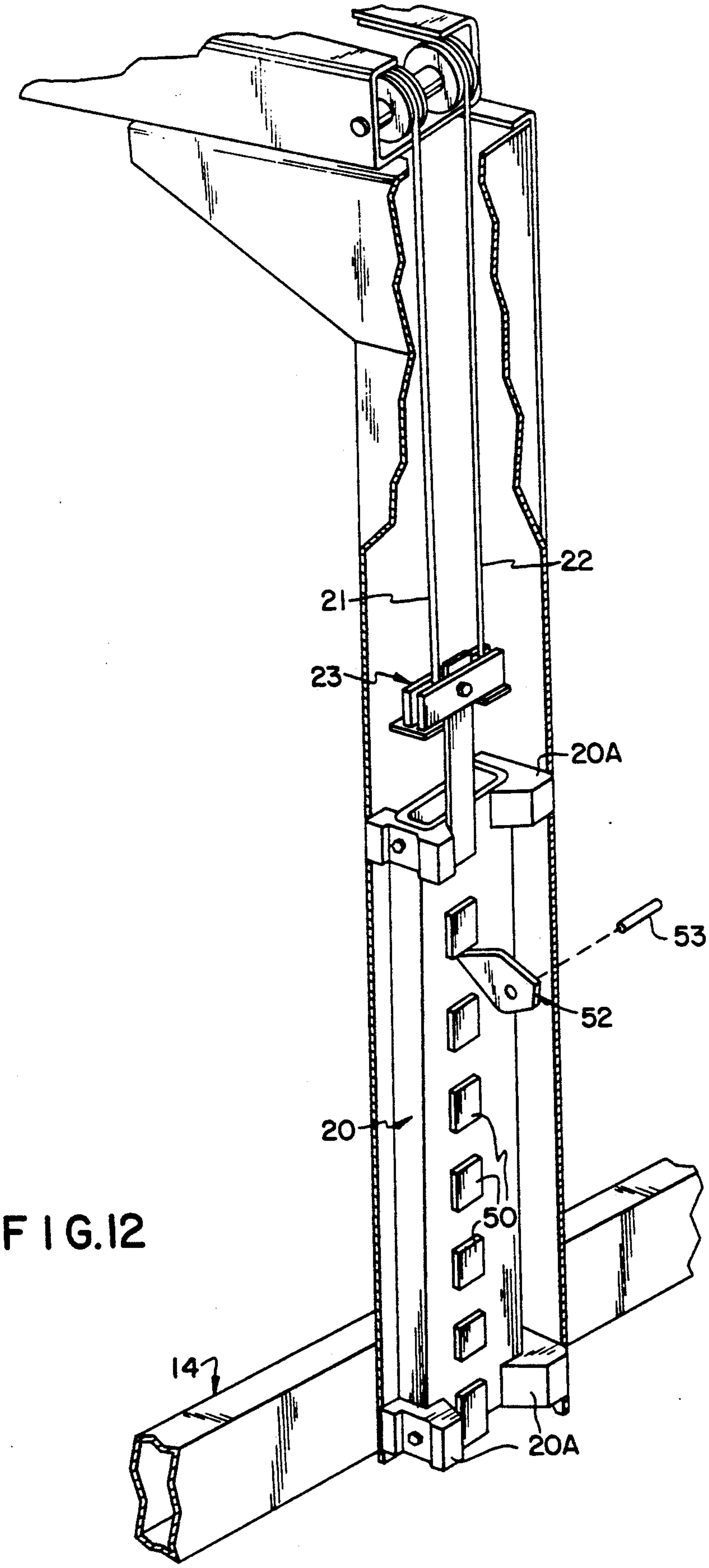
FIG. 12 is a perspective view further illustrating the operation of the safety lock means.
Figure 13:
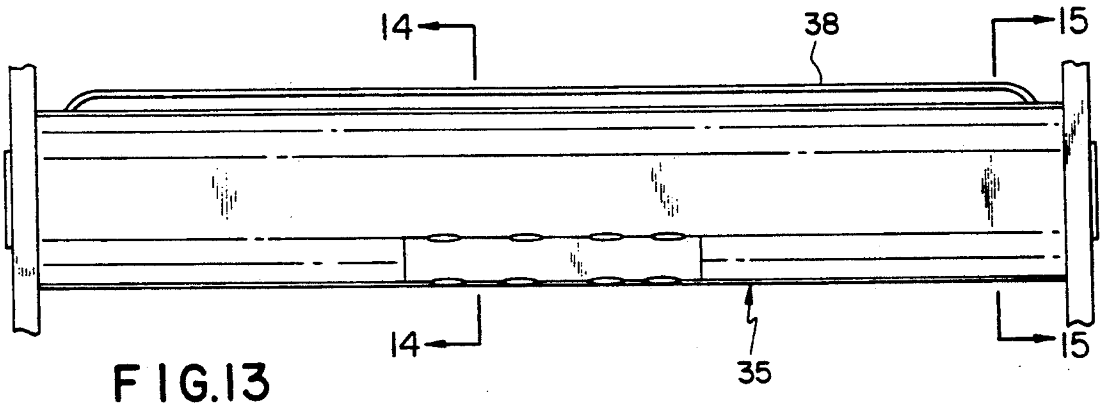
FIG. 13 is a bottom view of one embodiment of tray which is useful in the invention.

A preferred safety lock system used in the apparatus of the invention is illustrated in FIGS. 11 and 12. The rack comprises projections or ledges 50 which are spaced apart and aligned vertically. In the embodiment shown, the ledges 50 are secured directly to the slider member 20. Alternatively, the ledges could be secured to a separate bar or strip which is in turn secured to the slider member.

Cooperating with the rack is a locking member 52 which is pivotably mounted on pin 53. As the slider members are raised (and thus the tool bars), the ledge 50 is able to move past the locking member 52 by tipping the locking member away from the slider member. Then the weight of the locking member causes it to move against the slider member again beneath the ledge member. As a result, the locking member prevents the slider member from falling downwardly in the event the cables or hydraulic unit should fail.

In order to release the lock system, lever 54 is manually pushed downwardly-to move the locking member 52 away from the ledges 50. Then the tool bar may be lowered.

In a preferred system, there is a safety lock associated with each of the tool bars. In other words, there is a rack on each slider member 20. There is also a locking member 52 supported by each upright member 16 and 18 which is associated with a rack on the respective slider member 20.

The two locking members are interconnected in a manner such that both can be released by a single lever 54. Elongated rod 55 extends upwardly from the locking member 52 to one end of an arm 56 at the upper end of the upright member 18. The opposite end of the arm 56 is secured to a horizontal rod 57 which extends through the cross member 19 to an arm 58 at the upper end of the other upright support member 16. Rod 59 is connected to one end of the arm 58 and extends downwardly to the locking member 52.

Thus, downward movement of the lever 54 causes the locking members 52 on both upright supports to be simultaneously released from both racks on the two slider members. This is a distinct advantage over various previously known locking systems on hoists where it is necessary to separately release the locks on each side of the hoist.

Another advantage of the lock release system used herein is that when rod 55 is urged upwardly, this causes rod 59 to also be urged upwardly to release the locking member for the other tool bar. When rod 55 moves downwardly this enables the locking member in support member 18 to again engage the rack connected to the tool bar 14. If for any reason the locking member in support member 16 is prevented from engaging the rack connected to tool bar 12, that does not interfere with the locking member engaging the rack for tool bar 14.

Other means for simultaneously releasing both locking members can also be used, if desired. For example, cables or wires may be interconnected between the two locking members in a manner such that simultaneous release of the locking members is obtained by placing tension on the cables or wires.

The control lever 60 for operating the hydraulic power unit is preferably located adjacent the lock release lever 54, or at least on the same upright support member, so that the operator can release the lock system and lower the tool bars from the same location.

Control lever 60 is connected to a vertical rod 61 which extends upwardly to switch means 62. Upward movement of pivotable lever 60 causes rod 61 (which is pivotably attached to the opposite end of lever 60) to move downwardly. This causes arm 64 carrying switch means 62 to pivot downwardly. Switch push button 62A thereby encounters ledge or plate 63. Closure of this electric switch activates electric motor 27 which then drives hydraulic pump 31. Hydraulic fluid is pumped from the reservoir 29 through the valve body assembly and through line 34A to cause ram 24A of cylinder 24 to be retracted into the cylinder. This retraction of the ram results in uniform lifting of the tool bars 12 and 14. When lever 60 is returned to its neutral position the switch arm is raised and the electric motor stops. The tool bars also stop raising when the electric motor stops. Hydraulic pressure in the line prevents the tool bars from lowering. Also, the locking members engage the racks connected to the tool bars to provide a mechanical locking to prevent the tool bars from lowering.

When it is desired to lower the tool bars, the locking members are first released as previously described above. Then the control lever 60 is pushed downwardly. This causes rod 61 to move upwardly, whereby switch arm 64 is pivoted upwardly. Control shaft 33, which is secured at one end to arm 64, is caused to rotate in response to arm 64 being pivoted. The opposite end of shaft 33 is received in valve body assembly 32, and this end of the shaft 33 includes a recessed ledge portion 33A. When shaft 33 is rotated in one direction it causes a valve 70 to open to allow hydraulic fluid in line 34A to flow back into the reservoir 29. As the fluid drains back to the reservoir the tool bars are able to be lowered slowly.

Figure 28A:
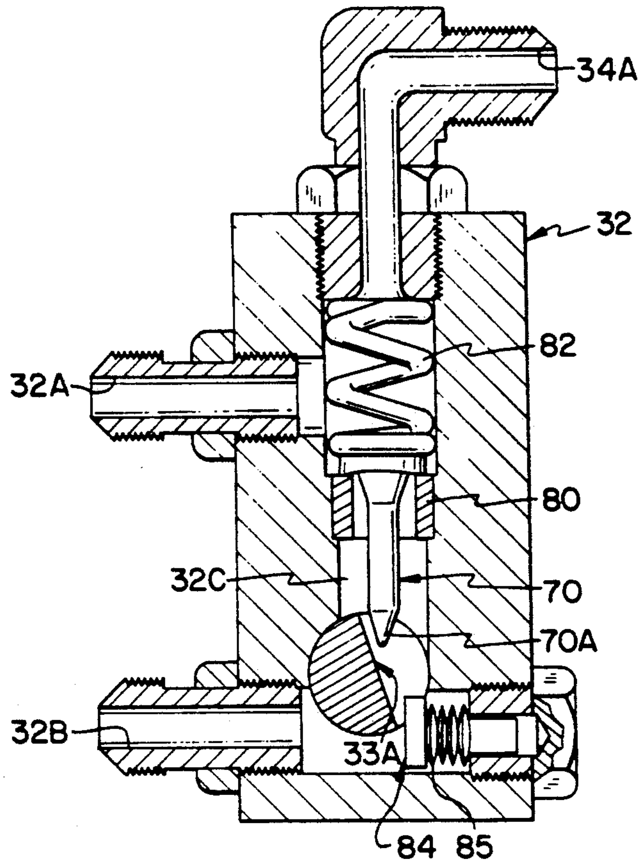
FIGS. 28A and 28B are elevational cut-away views showing a preferred embodiment of hydraulic release valve which is useful in the apparatus of this invention.
Figure 28B:
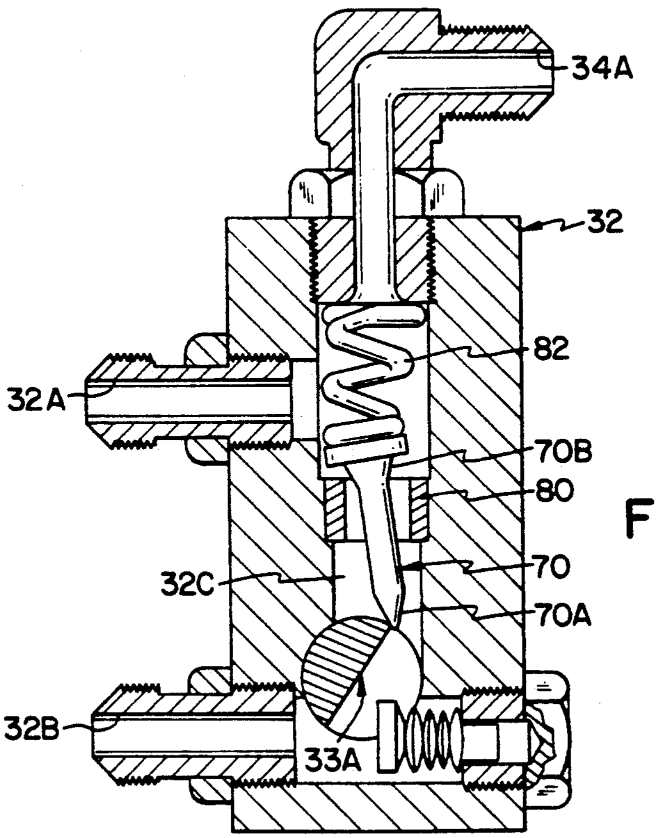

The preferred valve system is illustrated in FIGS. 28A and 28B. Hydraulic fluid from the pump 31 is forced through passageway 32A in an inlet port in valve body 32 and out through an outlet port or opening in line 34A for causing the ram 24A to be retracted into cylinder 24 (for lifting the tool bars). In this mode the valve 70 remains in contact with seat 80. Valve 70 in this position prevents the hydraulic fluid from draining back to the reservoir through passageway 32C and outlet port 32B.

In order to open the valve and permit hydraulic fluid to drain back to the reservoir, the control shaft is caused to rotate slightly in one direction in a manner such that the ledge portion 33A engages the lower end 70A of valve 70 and causes the valve to be tipped and then lifted relative to the seat 80 (as illustrated in FIG. 28B).

When valve 70 is initially engaged by ledge portion 33A, the valve 70 is first caused to tilt slightly away from seat 80 on one side. The small opening which results between the head of the valve and the seat enables hydraulic fluid to begin flowing downwardly past the valve and into the passageway 32 B for return to the reservoir. This initial tipping movement of valve 70 does not require significant force to be applied to the lower end 70A of the valve. In other words, the length of the valve stem 70 compared to the diameter of the valve seat 80 provides a favorable mechanical advantage which enables a small mechanical force to overcome the pressure of the hydraulic fluid in the system. This is a unique advantage of the valve system of this invention.

After the valve 70 has been tilted slightly to one side relative to the seat 80, continued rotation of shaft 33 causes additional tilting of valve 70. Additional engagement of ledge 33A against end 70A urges valve 70 upwardly away from seat 80 (as illustrated in FIG. 28B) to create a larger opening for the hydraulic fluid to flow through the valve assembly and into the reservoir. In other words, as the ledge portion engages the lower end of the valve stem 70, there are both a vertical force component and a horizontal force component created. This causes initial tilting or tipping of the valve and then subsequent lifting of the valve relative to the seat 80.

The pressure drop across the valve seat is reduced after the valve is initially tilted. The force which is then required in order to lift the valve off the seat is therefore reduced.

Thus, the operation of the release valve described herein is a significant improvement over conventional release valves in which a movable valve component is moved directly against the hydraulic pressure in the system, which requires significant force.

The valve 70 preferables include a conical or sloped portion 70B directly under the head of the valve to facilitate centering of the valve with respect to the seat 80 when shaft 33 returns to its original position. Spring 82 biases the valve 70 to its normally closed position. Pin 84, with associated spring assembly 85, urges shaft 33 back to its normal position as shown in FIG. 28A when the shaft is rotated opposite of the direction required to engage valve 70. Although the lower end 70A of the valve stem is preferably tapered (as illustrated in the drawings), it is not required to be tapered. For example, the valve stem could be a cylindrical body with no tapered end.

Another feature which may be included in the apparatus used in this invention is a high lift warning system. For example, a source 66 of electromagnetic radiation may be secured to the upper end of one of the upright support members and a reflector 65 is secured to the upper end of the other upright support member. The source 66 emits a narrow beam of radiation (e.g., infrared radiation) which is directed toward the reflector 65. The reflected beam is received by the detector portion of source 66. If an object being lifted by the tool bars extends into the path of the beam and obstructs it, then the detector no longer receives the beam. This causes an audible alarm to be sounded to warn of the high lift condition. When the electric motor which powers the hydraulic lift system is stopped, this also turns off the audible alarm.

Another advantage of the warning system illustrated in the drawings is that electrical power is required only on the upright support member 18. There is no need to extend electrical power to support member 16. The reflector 65 does not require any electrical power.

Other types of warning systems may also be used. For example, a light source can be attached to one of the upright members and a photodetector for receiving a light beam from the light source can be attached to the other upright support member. When an object being lifted blocks the light beam, the photodetector activates an audible alarm to warn of the high lift condition.

Of course, it is also possible to mount the light source and detector (or a reflector) on walls or other support structure which is adjacent to the lifting apparatus to serve the same or a similar purpose.

Figure 24:
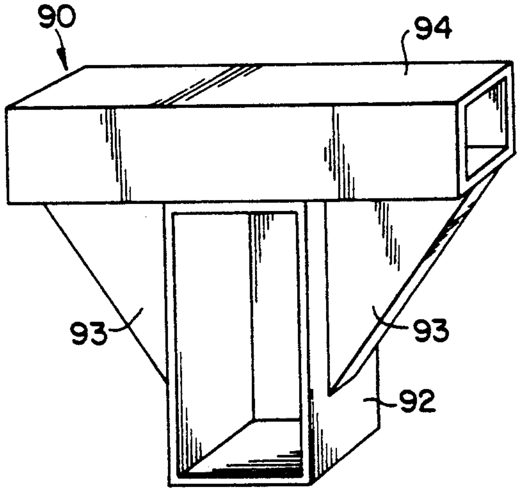
FIG. 24 is a perspective view illustrating another embodiment of fork hanger which is useful in this invention.
Figure 25:
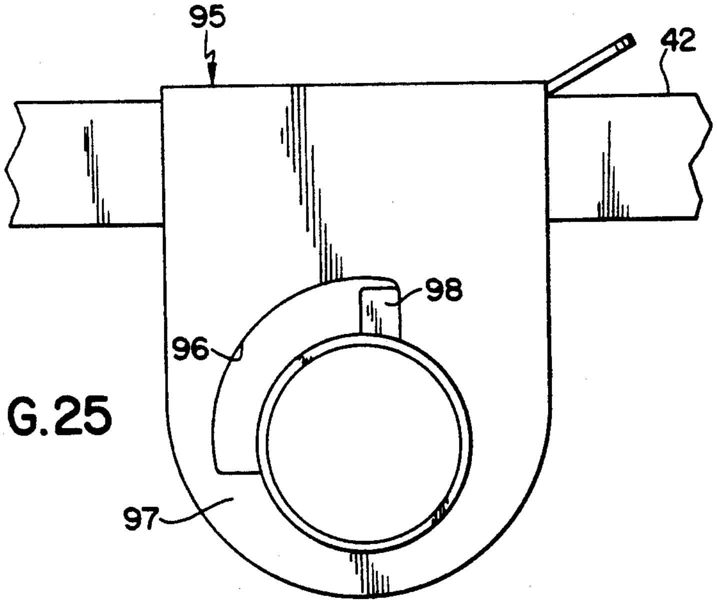
FIG. 25 is an end elevational view illustrating another embodiment of tool bar and fork hanger means which are useful in this invention.

FIGS. 24 and 25 illustrate other useful hanger means which may be used in this invention to attach and support the fork members on a tool bar. In FIG. 24 the hanger means 90 comprises a tubular section 92 which is adapted to slidably engage a tool bar having a rectangular cross-section. To the top surface of the section 92, and perpendicularly thereto, there is secured another tubular section 94. Bracing members 93 may be welded or otherwise secured between the two tubular sections for reinforcement purposes. Tubular section 94 is shown as having a square cross-section for slidably receiving a fork shank having a square cross-section. Thus, the hanger 90 can be moved longitudinally along a tool bar member, and a fork shank can be moved transversely or laterally relative to the tool bar member.

FIG. 25 is an end view illustrating a non-circular tool bar member 95. This tool bar comprises a generally cylindrical tube or bar having a square or rectangular cross-section key member secured to its outer surface, as illustrated. A hanger means 95 includes a lower section having an opening therethrough which generally conforms to the outer surface of a major portion of the tool bar 97. Preferably, the opening includes an expanded portion 96, as illustrated. The hanger 95 can be moved longitudinally along tool bar 97. The presence of the expanded opening portion 96 enables the hanger to be rotated approximately 90° in one direction (e.g., to enable the hanger to be tilted upwardly and away from the vehicle to be lifted).

Hanger 95 also includes a transverse opening for slidably receiving fork shank member 42. The shank 42 can be moved transversely or laterally with respect to tool bar 97.

Other variants are possible without departing from the scope of this invention.

What is claimed is:

1. A pressure release valve assembly for use in a supply line of pressurized fluid, said valve assembly comprising:

(a) a housing including an inlet port and first and second outlet ports; wherein said housing further includes first and second passageways; wherein said first passageway extends between said inlet port and said first outlet port for enabling pressurized fluid to flow through said housing; and wherein said second passageway extends between said first passageway and said second outlet port and includes a valve seat;

(b) a valve member positioned to normally close said second passageway; wherein said valve member includes a head portion and an elongated stem portion secured to said head portion; wherein said stem portion extends downwardly from said head portion into said second passageway; and wherein said head portion is adapted to close said second passageway; and (c) bias means for biasing said head portion against said valve seat;

(d) control cam means for tilting said valve member relative to said second passageway to release pressure in said supply line by allowing said fluid to flow from said first passageway to said second outlet port through said second passageway; wherein said control means is adapted to urge said stem portion laterally with respect to the longitudinal axis of said second passageway; wherein said control cam means comprises a shaft which includes a ledge portion which engages said stem portion of said valve member when said shaft is rotated to cause said head portion to be initially tilted away from said valve seat to enable said fluid to flow through said second passageway at a first flow rate; wherein further rotation of said shaft causes said head portion of said valve member to be further lifted away axially from said valve seat by said ledge portion to enable said fluid to flow through said second passageway at a second flow rate which is greater than said first flow rate.

2. A valve assembly in accordance with claim 1, wherein the axis of said shaft is perpendicular to the axis of said stem portion.

3. A valve assembly in accordance with claim 1, wherein said stem portion includes a tapered end.

4. A valve assembly in accordance with claim 1, wherein said control means is further adapted to raise said head portion away from said seat after said head portion is tilted.

5. In a hydraulic system of the type including a reservoir for hydraulic fluid, a pump, a supply line extending from said pump to cylinder means, and a valve assembly in said supply line, wherein the valve assembly includes a housing having an inlet port, first and second outlet ports, and first and second passageways; wherein said first passageway extends between said inlet port and said first outlet port for enabling pressurized fluid to flow through said housing; wherein said second passageway extends between said first passageway and said second outlet port and includes a valve seat; wherein said pump is adapted to force said fluid from said reservoir through said supply line to said cylinder means; wherein the improvement comprises:

(a) a valve member positioned to normally close said second passageway; wherein said valve member includes a head portion and an elongated stem portion secured to said head portion; wherein said stem portion extends downwardly from said head portion into said second passageway; and wherein said head portion is adapted to close said second passageway; and (b) bias means for biasing said head portion against said valve seat;

(c) control cam means for tilting said valve member relative to said second passageway to release pressure in said supply line by allowing said fluid to flow from said first passageway to said second outlet port through said second passageway; wherein said control cam means is adapted to urge said stem portion laterally with respect to the longitudinal axis of said second passageway, wherein said control means comprises a shaft which includes a ledge portion which engages said stem portion of said valve member when said shaft is rotated to cause said head portion to be initially tilted away from said valve seat to enable said fluid to flow through said second passageway at a first flow rate; wherein further rotation of said shaft causes said head portion of said valve member to be further lifted away axially from said valve seat by said ledge portion to enable said fluid to flow through said second passageway at a second flow rate which is greater than said first flow rate.

6. The improvement in accordance with claim 5, wherein said shaft is adapted to be rotated in first and second directions; wherein when said shaft is rotated in said first direction said ledge portion engages said stem portion of said valve member; and wherein when said shaft is rotated in said second direction said shaft causes said pump to be activated.

* * * * *